United States Patent [19]

Judenich

[11] Patent Number: 4,962,420
[45] Date of Patent: Oct. 9, 1990

[54] ENTERTAINMENT VIDEO INFORMATION SYSTEM HAVING A MULTIPLANE SCREEN

[75] Inventor: Gennady I. Judenich, Moscow, U.S.S.R.

[73] Assignee: Teatr Polifonicheskoi Dramy, Moscow, U.S.S.R.

[21] Appl. No.: 174,989

[22] PCT Filed: Apr. 23, 1987

[86] PCT No.: PCT/SU87/00046
§ 371 Date: Jan. 15, 1988
§ 102(e) Date: Jan. 15, 1988

[87] PCT Pub. No.: WO87/07173
PCT Pub. Date: Dec. 3, 1987

[30] Foreign Application Priority Data
May 19, 1986 [SU] U.S.S.R. ................. 4076152

[51] Int. Cl.$^5$ .......... H04N 9/31; A63J 1/02; B24B 19/00; G03B 21/00
[52] U.S. Cl. .................. 358/60; 358/104; 358/231; 52/6; 272/10; 272/11; 272/22; 350/117; 352/43; 353/10
[58] Field of Search ............ 52/6; 160/88; 272/10, 272/11, 22; 340/717; 352/43, 69, 70; 350/117, 123, 125; 353/10, 30, 94, 119, 122; 358/56, 60, 87, 93, 104, 230, 231

[56] References Cited

U.S. PATENT DOCUMENTS

| | | | |
|---|---|---|---|
| 2,147,648 | 2/1939 | Greathouse | 272/10 |
| 2,150,543 | 3/1939 | de Ybarrondo | 272/10 |
| 2,383,493 | 8/1945 | Mercer | 272/10 |
| 2,591,068 | 4/1952 | Hilchey | 272/11 |
| 3,069,970 | 12/1962 | Pierson | |
| 3,192,827 | 7/1965 | Nagy | |
| 3,514,871 | 6/1970 | Tucker | 353/30 |
| 3,754,756 | 8/1973 | Szigety | 272/10 |
| 3,945,132 | 3/1976 | Parmelee | 272/10 |
| 4,095,882 | 6/1978 | Karamon | 272/10 |

FOREIGN PATENT DOCUMENTS

2323422 4/1977 France .

OTHER PUBLICATIONS

I. B. Gordiichuk, Spravochnik kinooperatora, Iskusstvo, Moscow, 1979, pp. 64–67.
"National Multi Vision," Matsushita Electric Industrial Co., Ltd., Tokyo (incomplete) (author and date of publication unknown).

Primary Examiner—Alvin Oberley
Assistant Examiner—Randall S. Svihla
Attorney, Agent, or Firm—Lilling & Lilling

[57] ABSTRACT

A video information system includes a screen (1) having at least two cells (2–5, 14–16) rotatable in at least one direction and forming a three-dimensional multi-plane screen system changeable in space. Information from at least one projector is fed to two or more cells (2–5). Video information is presented in an in-depth three-dimensionally unfolding space. The system also has the capability of producing simultaneous changes in time, and the screen system can be efficiently combined with scenery attributes. The video information can be fed to the cells of the screen in the form of front or rear projection.

18 Claims, 8 Drawing Sheets

ENTERTAINMENT VIDEO INFORMATION SYSTEM HAVING A MULTIPLANE SCREEN

Video information is presented in an in-depth three-dimensionally unfolding space. The system also has the capability of producing simultaneous changes in time, and the screen system can be efficiently combined with scenery attributes. The video information can be fed to the cells of the screen in the form of front or rear projection.

BACKGROUND OF THE INVENTION

1. Field of the Invention

The invention relates to stage equipment for mass entertainment and, more particularly, to a video information system.

2. Description of the Prior Art

Known in the art is a number of systems which make it possible to produce a theatrical performance, combining different show types, i.e. with cinematography or television, etc.

Known in the art is a system which is a cinema amusement system developed for a world fair. The screen of this system is dome-shaped, a round auditorium is covered by a dome which is a base for the screen. The film is projected by a special film projector placed in the centre of the auditorium and directed upwards. The dome and the auditorium floor are inclined in one and the same direction at an angle of 10°. The audience watches a film while standing behind handrail rows installed at different levels in ascending circles. Inclination of the dome and floor determines initial orientation in the main direction of action which takes place around, and above the audience. The angle of vision with respect to the screen is 360° in a horizontal plane and 160° in a vertical plane.

However, the system is only two-dimensional and the audience does not get the illusion of space (I. B. Gordiichuk et al. "Spravochnik kinooperatora", 1979, Iskustvo, Moscow, p. 67), the illusion of space being only produced by shots on the film.

Also known in the art is a multicamera TV-system comprising three projection television cameras sending the image, via distribution and monitoring units, to a multiscreen television device. This device comprises a plurality of television monitors disposed so that their screens are in one and the same plane (Matsushita Electric Industrial Co., Ltd, Japan, "National Multi Vision").

The known multiscreen device may be used so that different images can be supplied to different sections thereof.

Since the common screen is a composite array, the audience sees a separating band between individual parts thereof which is superimposed on the general image and hinders the perception thereof as a whole.

Furthermore, this system is two-dimensional and does not produce the illusion of space so that its application is only determined by the capabilities of a television show wherein a three-dimensional image is produced from a video tape.

Also well-known in the art is a system for producing gala performances combining theatrical or concert performances with cinema or television image on the screen. Such screen may be made as a polyscreen, or it can consist of several separate screens.

In such systems, an enlargement of functional capabilities of the stage box amounted to nothing more than the use of flat viewing screens which were placed in the stage plane and on which a film was shown.

However, the enlargement of the screen plane first to a wide frame and then to a panorama (including a circarama) has not improved the three-dimensional impact of the screen (I. B. Gordiichuk et al. "Spravochnik kinooperatora", 1979, Iskusstvo, Moscow, p. 64–66).

Known in the art are video information systems comprising a sectional screen having a plurality of cells. Individual information from one or several projectors is sent to each cell or any number of cells (U.S. Pat. No. 3,192,827).

Such video systems may be easily used in combination with theatrical or concert performances.

The capabilities of ensuring the three-dimensional impression from information being displayed are limited in these video systems, hence the illusion of an infinite deep space cannot be produced.

SUMMARY OF THE INVENTION

The invention is to provide a video information system in which the range of psychological and emotional impact of the information being dispayed upon the audience is enlarged owing to the representation of an object in an in-depth three-dimensionally unfolding space changing in time.

This problem is solved by a video information system comprising a sectional screen having at least two cells, each cell or any combination of cells receiving individual information from at least one projector. According to the invention, at least two cells of a sectional screen are rotatable and/or movable in space in at least one direction and form a three-dimensional variable multiple-plane screen system.

The video information system according to the invention considerably enlarges the functional capabilities of the system as compared to similar devices and enhances psychological and emotional impact of information being transmitted upon the audience or trainees.

If the video information system is combined with scenery objects, it is preferred that such objects be placed at least in front of each cell of the three-dimensional multiple-plane screen system so as to form a three-dimensional stage space.

This makes it possible to boost-up the impact of a theatrical or concert performance upon the audience.

In a video information system comprising a sectional screen having three cells, the first cell being transverse and the remaining cells being longitudinal, the transverse cell preferably extends at the top of, and across the sectional screen and is rotatable about an axis drawn along the upper edge of the sectional screen.

The first transverse cell of the sectional screen in the video information system is preferably movable up and/or down with respect to the longitudinal cells.

Each longitudinal cell of the sectional screen in the video information system is also preferably rotatable about an axis drawn along a respective lateral edge of the sectional screen.

Each longitudinal cell of the sectional screen in the video information system may be movable along the sectional screen plane.

Each longitudinal cell of the sectional screen in the video information system may also be movable in a direction perpendicular to the sectional screen plane.

Such rotatable and movable cells make it possible to provide a three-dimensionally variable stage space changing in time.

In a video information system comprising a sectional screen having at least four cells, the first cell being transverse and the remaining cells being longitudinal, the first transverse cell preferably extending at the top of, and across the entire sectional screen and is rotatable about an axis drawn along the upper edge of the sectional screen.

The transverse cell of the sectional screen in the video information system is preferably movable up and/or down.

The transverse cell of the sectional screen in the video information system is also preferably movable in a direction perpendicular to the sectional screen plane.

Each longitudinal lateral sectional cell of the sectional screen in the video information system may be rotatable about an axis drawn along a respective lateral edge of the sectional screen.

Each longitudinal lateral cell of the sectional screen in the video information system may further be made movable along the sectional screen plane.

At least one longitudinal cell in the video information system may also be disposed between the longitudinal lateral cells and made movable along the sectional screen plane.

At least one longitudinal cell in the video information system is preferably disposed between the longitudinal lateral cells and made movable in a direction perpendicular to the sectional screen plane.

At least one longitudinal cell in the video information system is preferably disposed between the longitudinal lateral cells and made rotatable about an axis drawn in parallel with the lateral edge of the sectional screen.

Each cell in the video information system may form a sectional screen.

The abovedescribed arrangements of cells make it possible to provide a three-dimensionally variable stage space changing in time as in the case of the previously mentioned embodiments.

If a projector in the video system is disposed behind the sectional screen cells, it is preferred that at least one projector be installed in front of at least one cell of the sectional screen so as to simultaneously carry out the rear and front projection of an image on this cell.

This increases the volume of information being transmitted, the variety of its types and forms and enhances the impact produced upon the audience.

It is preferred that the video information system also be provided with at least two multiple plane three-dimensional screen systems disposed in series along one line.

The video information system may be provided with at least two multiple-plane three-dimensional screen systems disposed in parallel directly one after another.

The video information system may also be provided with a group of at least two multiple-plane three-dimensional screen systems disposed in series along at least a part of the perimeter of one curvilinear surface.

The video information system may finally be provided with a second group of at least two multiple-plane three-dimensional screen systems disposed in series along at least a part of the perimeter of a second curvilinear surface having a greater curvature radius than that of the first curvilinear surface.

Using the video information system according to the invention, a substantially new theatrical show is produced which carries out transformation in space and time and produces the maximum effect of presence of the audience and its participation in the action of a certain theatrical show.

Other objects and advantages of the present invention will be apparent from the following detailed description of embodiments thereof accompanied by the attached drawings.

DESCRIPTION OF THE PREFERRED EMBODIMENTS

Described below are examples of applications of the present invention in a theatrical show. However, its use for other purposes, including training, involves no substantial changes.

A video information system according to the invention comprises a sectional screen 1 (FIG. 1) having a plurality of cells. As illustrated in the embodiment shown in FIG. 1, the sectional screen 1 has two longitudinal cells 2 and 3 and two transverse cells 4 and 5.

Figure 1:
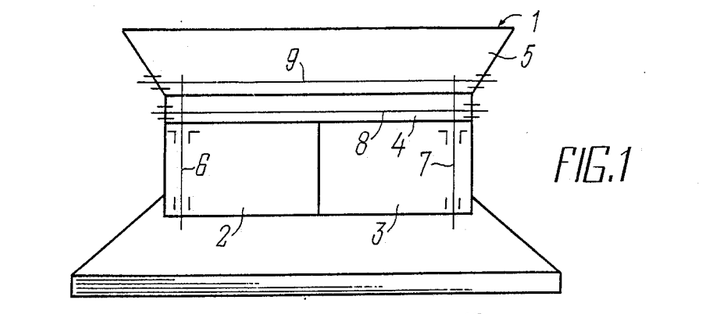
FIG. 1 illustrates a video information system having two longitudinal cells, according to the invention.

All cells of the screen 1 are rotatable and/or movable in space at least in one direction, the three-dimensionally variable multiple-plane screen system being formed. Variation of the three-dimensional position of cells of the screen 1 is carried out at will both for one of the cells and for a group of cells in any direction depending on information sent to each of the cells, their form and effect being produced by this information.

Described below are embodiments of multiple-plane systems wherein one or several cells are moved or turned in space. However, the described embodiments do not encompass every possible combination of three-dimensional positions of cells, nor do they describe all possible combinations of the cell types within one screen. Moreover, the multiple-plane screen system is described as applied to a theatrical stage performance, which does not limit all possible uses thereof mentioned above.

As mentioned above, FIG. 1 shows the screen 1 having the four cells 2 through 5. Each of the cells 2 to 5 has an axis 6, 7, 8 and 9, respectively, about which the cells are turned at a certain angle. The axes 6 and 7 of rotation of the cells 2 and 3 extend along the lateral edges of the screen 1. The axes 8 and 9 of rotation of the cells 4 and 5 extend along the upper edge of the screen 1.

The cell 5 is shown turned at an angle of 120° with respect to the plane of the longitudinal cells 2 and 3. the lateral edges of the screen 1.

Described below (FIGS. 2 and 3) are embodiments of a sectional screen 12 or 13 having a different number of cells. As the sectional screen 1 is used in a theatrical stage performance, pylons 10 and 11 are disposed along the lateral edges of the screen 1.

Figure 2:
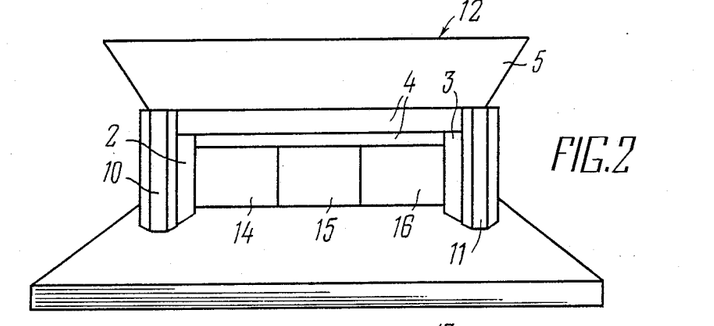
FIG. 2 is an alternative modification of a video information system, according to the invention.

In FIG. 2, the screen 12 has longitudinal cells 2, 3, 14, 15 and 16, the cells 2 and 3 being lateral cells, and transverse cells 4, 5 and 17, the longitudinal cells 14 to 16 and the transverse cell 17 being moved backwards deeper behind the main plain of the screen 12 which plane coincides in this embodiment with the plane of the transverse cell 4, and the cell 17 being in a different plane with respect to the cells 14 to 16. Furthermore, the transverse cell 5 is turned upwards with respect to the main plane of the screen 12, and the lateral cells 2 and 3 are turned backwards deeper with respect to the main plane of the screen 12.

Figure 3:
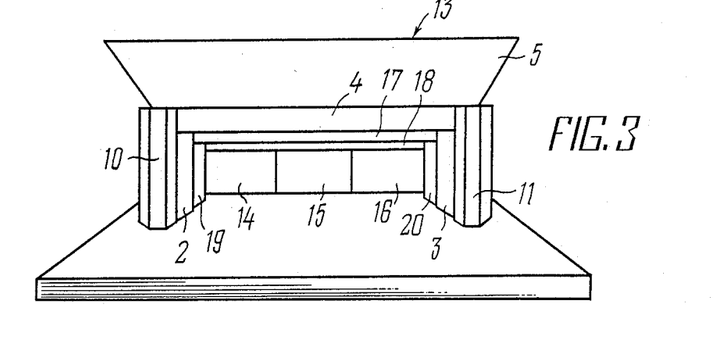
FIG. 3 is a video information system having four transverse cells, according to the invention.

A video information system shown in FIG. 3 differs from the abovedescribed systems in that it has one more group of movable cells having a transverse cell 18 moved backwards deeper behind the screen 13 with respect to the cell 17 and longitudinal cells 19 and 20 mounted in front of the cells 14 to 16 and turned with respect to these cells.

Figure 4:
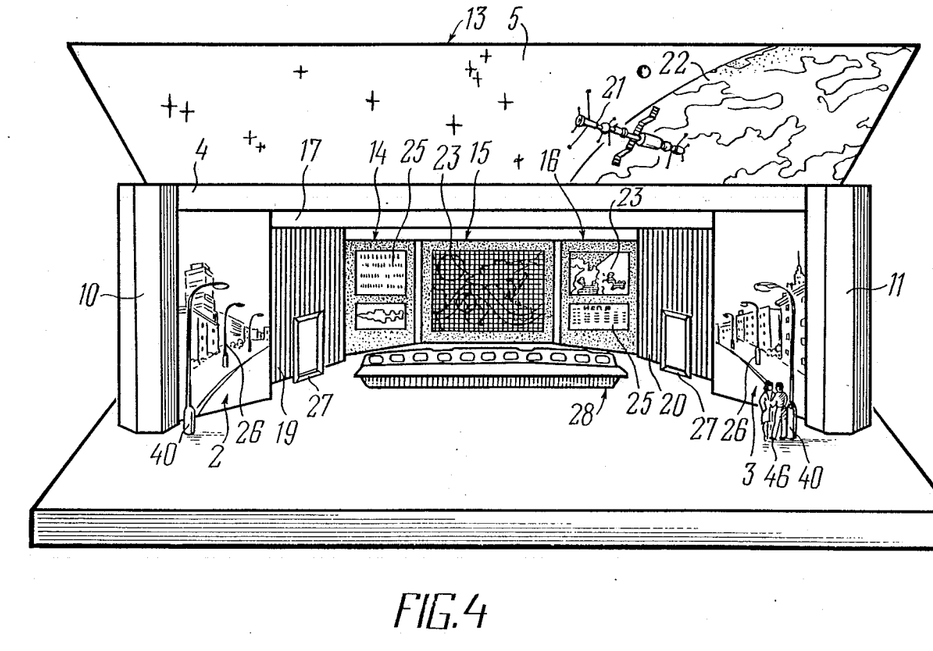
FIGS. 4, 5 and 6 are some examples of applications of a multiple-plane three-dimensional screen system, according to the invention.
Figure 5:
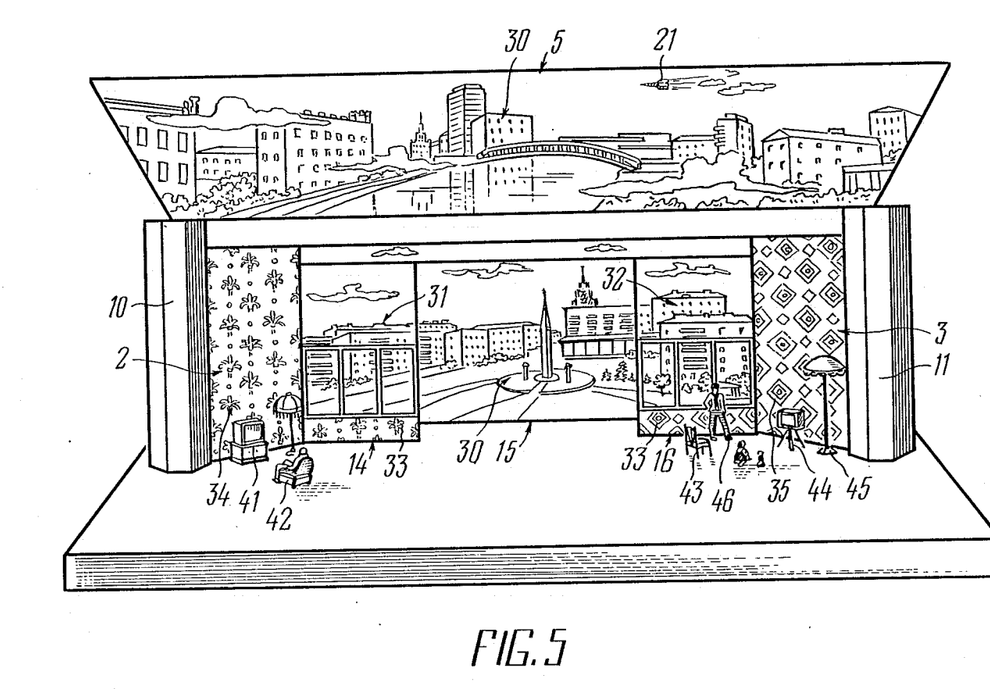
Figure 6:
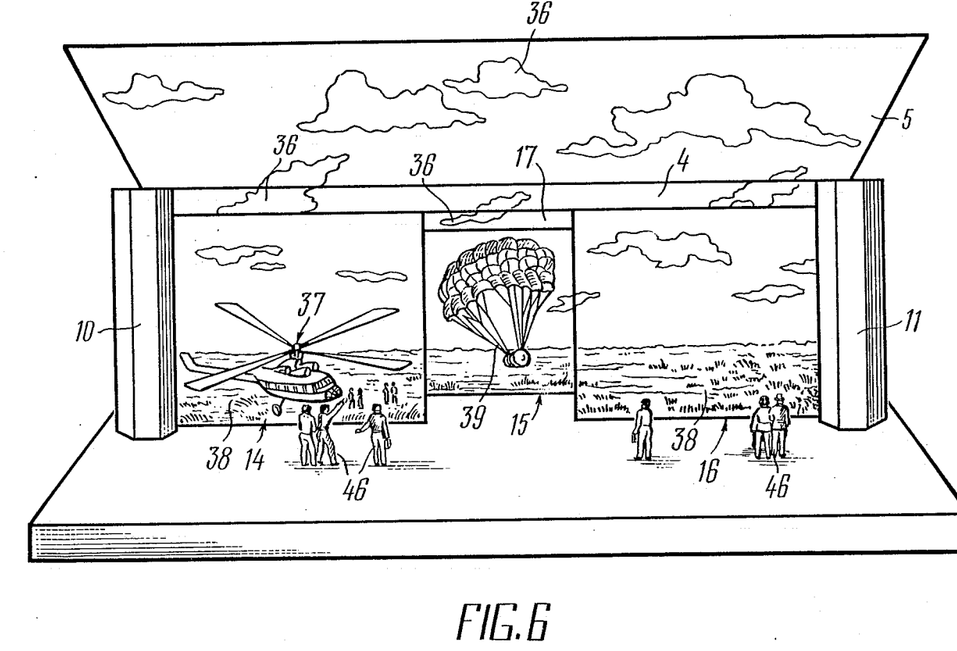

FIGS. 4, 5 and 6 show some examples of applications of the multiple-plane three-dimensional screen system. FIG. 4 shows a diagrammatic view of a control desk and information concerning the flight of a spacecraft. Information concerning location of a spacecraft 21 in outer space and with respect to the Earth 22 is sent to the cell 5 of the screen 13; the necessary maps 23, diagrams 24 and alphanumeric information 25 are displayed on the cells 14, 15 and 16. The lateral cells 2 and 3 show a projection 26 of street fragments, and details 27 decorating the room of a control desk 28 are placed in cells 19 and 20.

The control desk 28 is disposed in front of the screen 13.

FIG. 5 shows a projection of an apartment in several planes of a multiple-plane three-dimensional screen system according to the invention. In this system, the cell 5 of the screen 12 is turned at an angle of 90° with respect to the vertical plane, the cell 15 is moved backwards, and the cells 2 and 3 are turned with respect to the cells 14 and 16. The cell 5 displays a projection 29 of a perspective view of a city; the cell 15 displays a projection 30 of a perspective view of another end of the city which projection is a continuation of projections 31 and 32 presented in the form of stained-glass pictures as viewed out of the windows disposed in cells 14 and 16. Displayed on the same cells 14 and 16 are projections 33 of aparatment walls which projections are parts of projections 34, 35 of other walls which are projected on the lateral cells 2 and 3.

FIG. 6 shows another projection of the video information image on the screen 12 having the cell 15 moved backwards and the cell 5 turned. A projection 36 of the sky is displayed on the cell 5 and partially on the cells 4 and 17, an image 37 of a helicopter and a projection 38 of the Earth surface are shown on the lateral cells 14 and 16, and an image 39 of a landing spacecraft module is displayed on the cell 15.

The video information in accordance with FIGS. 4 through 6 which is represented on the screen 1 (12 or 13) may vary in time at will producing different three-dimensional scenes changing three-dimensionally and in time. This ensures a strong psychological and emotional impact upon the audience by producing the illusion of their direct participation in the events taking place by instantly changing the place where these events occur and bringing the audience from one place to another.

In order to enhance the impact upon the audience, scenery accessories are placed in front of any cell of the screen 1. In FIG. 4, lamp posts 40 are installed in front of the cells 2 and 3 in order to enhance the three-dimensional perception of a general picture of the city street fragment by combining it with the projection 26 of the city street, and the desk 28 is disposed in front of the cells 14 through 16. In FIG. 5, furniture pieces 41, 42, 43, 44, 45 supplementing the idea of the apartment serve the same purpose.

Furthermore, a real theatrical stage performance may take place in front of the screen 1, the real cast 46 acting in front of the cells 2 and 3, 14 through 16 and 19, 20 of the screen 12 or 13 (FIGS. 4 through 6).

Figure 7:
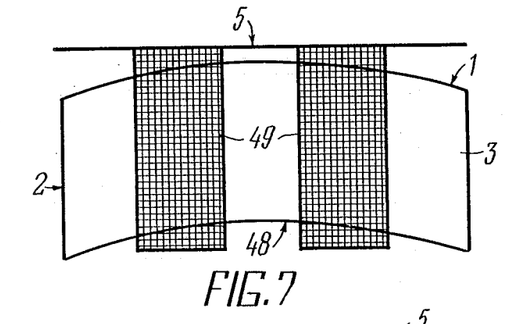
FIGS. 7, 8 and 9 are examples of combining a scenery representation with a sectional screen, according to the invention.
Figure 8:
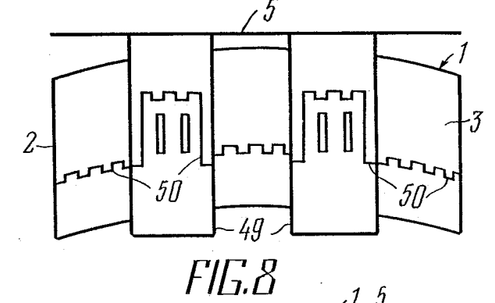
Figure 9:
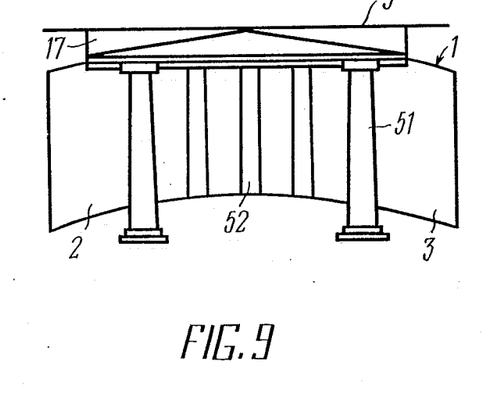
Figure 10:
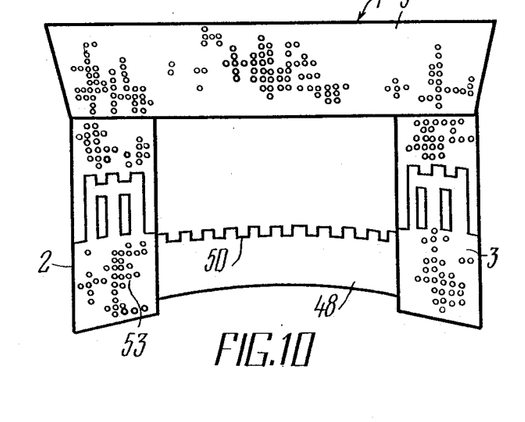
FIG. 10 is an example of combining a television image with information from a computer, according to the invention.

Other examples of combining the scenery with the screen 1 to which, e.g., a television image is sent are illustrated in FIGS. 7, 8 and 9.

In FIG. 7, additional screens 49 are installed in front of the lateral cells 2, 3 turned with respect to a cell 48, and FIG. 8 shows a television image 50 which is common for all the cells 2, 3, 48 of the screen 1 and the additional screens 49. In FIG. 9, scenery details 51 are installed in front of the screen 1, and a television image 52 integrally viewed with the scenery details 51 is displayed on the screen 1.

Figure 11:
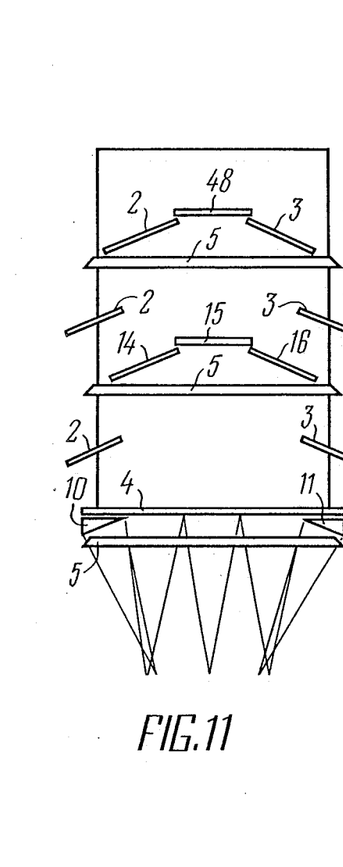
FIGS. 11, 12 and 13 are embodiments of a video information system comprising three screen systems, according to the invention.
Figure 12:
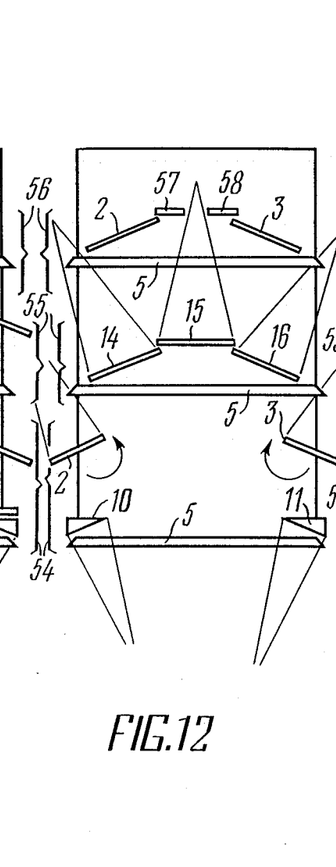
Figure 13:
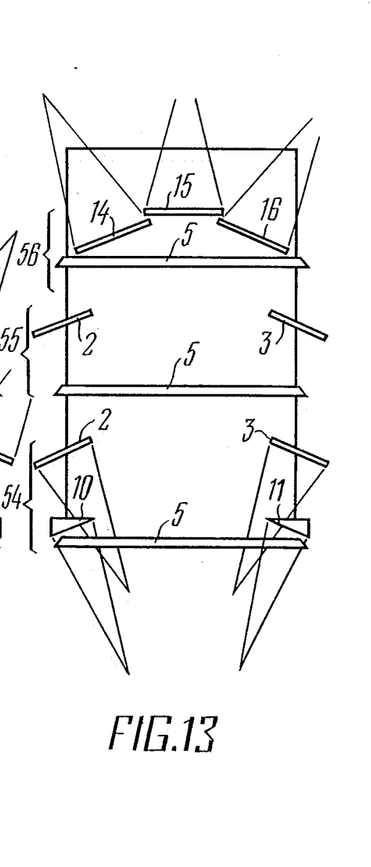
Figure 14:
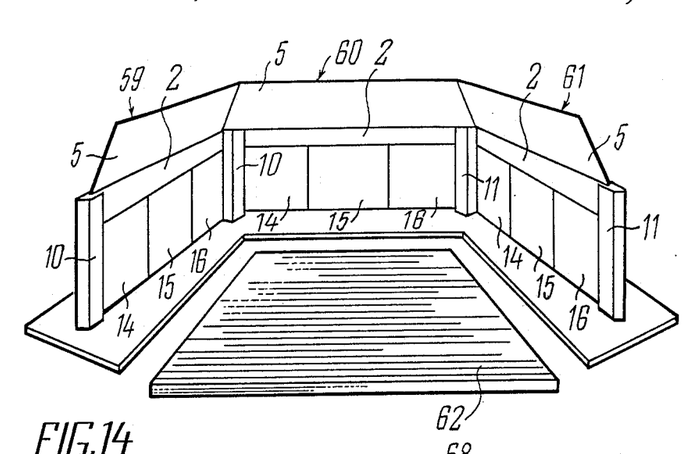
FIG. 14 is a video information system in the form of a stage triptych, according to the invention.
Figure 15:
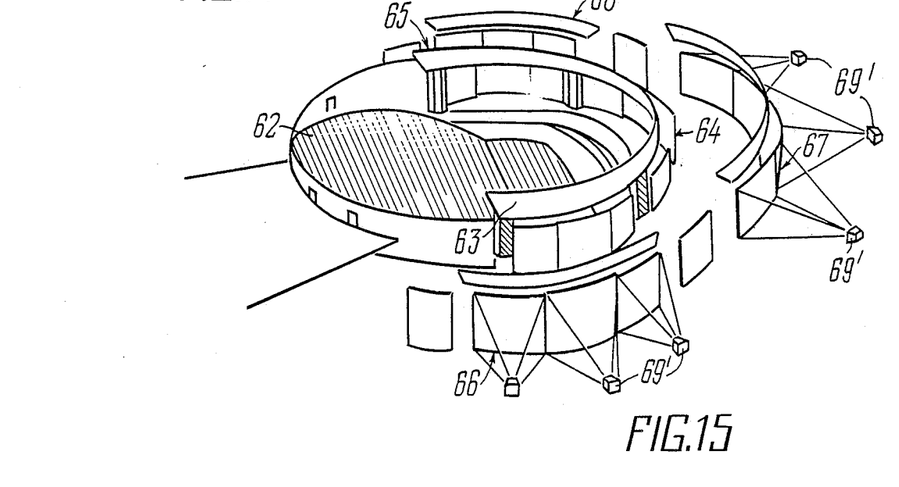
FIG. 15 is a video information system in the form of a circarama, according to the invention.
Figure 16:
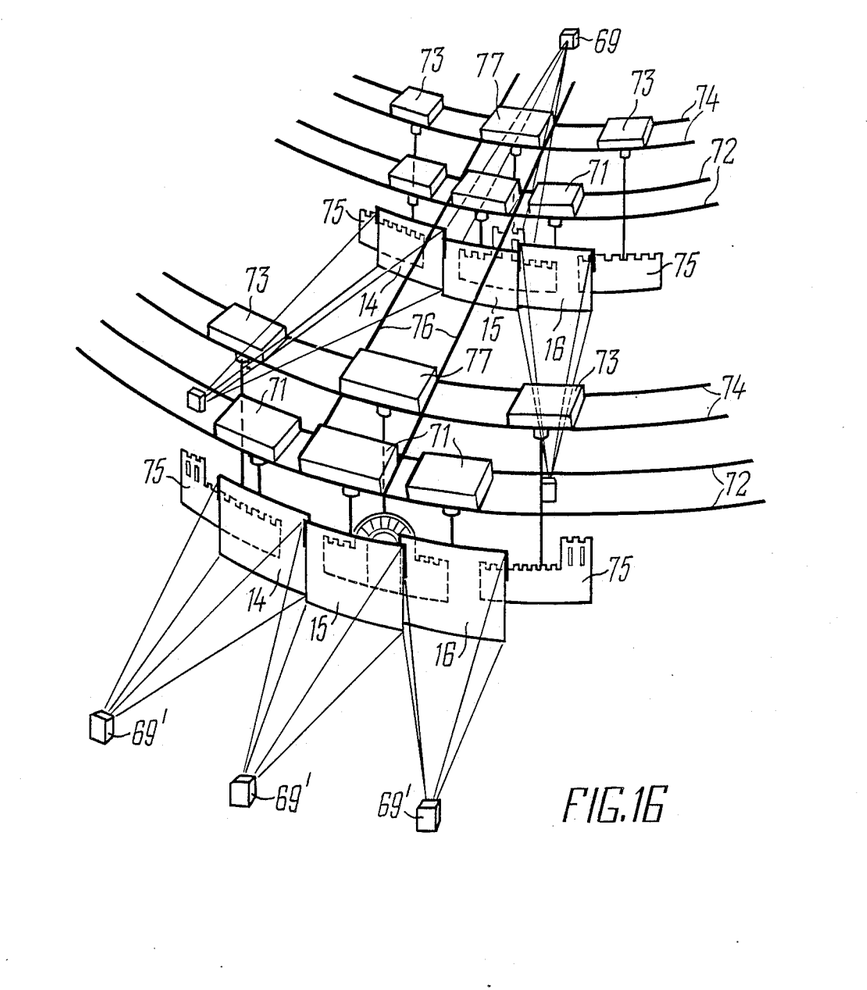
FIG. 16 is an embodiment of moving cells in a video information system, according to the invention.

The video information system according to the invention is made up of several multiple-plane three-dimensional screen systems disposed either in parallel with, and one after another as shown in FIGS. 11, 12 and 13, or at an angle with respect to one another (FIG. 14), or along two or more curvilinear surfaces (FIG. 15), or along a circle (FIG. 16).

FIGS. 11 through 13 show a plan view of a video information system comprising three screen systems 54, 55 and and 56, the cells 2, 3, 5, 48 being disposed in a different manner in each of these systems. Thus the lateral cells 2, 3 of the system 54 are turned and moved backwards with respect to the transverse cell 5 which is disposed at an angle with respect to the cells 2, 3, and the cell 4 is spaced from the cell 5.

The cells 2 and 3, 14 and 16 of the system 55 are also turned and moved backwards, and the cells 14, 16 are additionally moved with respect to the lateral cells 2 and 3 of the system 54; the cell 15 is moved with respect to the transverse cell 5 of the system 55, the cell 5 being turned upwards with respect to the longitudinal cells 2, 3, 14 through 16 of the same system. The cells 2, 3 and 48 of the system 56 are disposed in parallel with the cells 14, 16 and 15 of the system 55, respectively.

In FIG. 12, the systems 54 and 55 are made similar to each other, and the system 56 has two cells 57 and 58 disposed in its centre and spaced from each other.

In FIG. 13, the systems 54 and 55 are made identical and similar to the system 54 shown in FIG. 2, and the system 56 is identical with the system 55 shown in FIG. 12.

Multiple-plane three dimensional screen systems 59, 60 and 61 (FIG. 14) are aligned or disposed at an angle with respect to each other so as to form a stage triptych in the centre of which an auditorium 62 is disposed.

In FIG. 15, multiple-plane three-dimensional screen systems 63, 64 and 65 are disposed along a part of one circle, and similar screen systems 66, 67 and 68 are disposed along a part of another circle of a greater radius. The screen systems 63 through 65 and 66 through 68 are disposed one after another so as to produce a general perception effect. The auditorium 62 is disposed at the centre of the entire video information system. Any other curvilinear surface may be used instead of a circle. Information may be sent to the video information system by any known method from projectors 69', the number of projectors depending on the form of the sectional screen and the type of information.

The number of projectors installed is, e.g., equal to the number of cells, the individual information units being sent to each cell. Information received from one or several projectors may be arranged on the cells in any possible way. If the video system has several screen systems, e.g. as shown in FIGS. 11 through 15, each of these systems has its own projector 69 (FIG. 16) or a group of projectors 69.

Information from the projectors 69 and 69' is simultaneously or independently sent to one and the same cell by direct projection, respectively.

FIG. 16 illustrates an embodiment of moving cells. Each cell 14, 15, 16 of the screen 1 or 12 is secured to a frame 70 mounted on a carriage 71 which moves along guide members 72 disposed along two curvilinear surfaces. Scenery pieces 75 are mounted in a similar manner on carriages 73 moving along guide members 74. The guide members 74 are disposed along curvilinear surfaces similar to those in which the guide members 72 are disposed.

To ensure movement of the cells 15 in a different direction, the system has guide members 76 along which the carriage 71 of the cells 15 moves. A carriage 77 carrying the scenery pieces 75 also moves along guide members 76. The guide members and carriages are widely used in stage equipment for theatrical entertainment performances.

The video information system is used as follows.

Operation of the video system during a theatrical presentation showing the launching of a spacecraft is described below.

Shown in the foreground is the control desk 28 (FIG. 4) which is easily accessible for members of the cast 46 acting on the stage. The image of a demonstration panel containing the necesssary maps 23, diagrams 24 and information 25 which change during the performance in form and content is sent by projectors to the cells 14 through 16. Information on location of the spacecraft 21 in the outer space is sent by the projector to the cell 5, this information also changing in time.

In the second act of the theatrical show, the position of the cells 2, 3, 14 through 16 on the stage and the type of information displayed on these cells are changed, and other scenery accessories are disposed in front of them. The second act of the scenario of the outer space flight unfolds in an apartment, the city streets image being projected on the cells 5 and 15, the decorative stained-glass-like panels showing the streets as viewed from the windows being projected on the cells 14 and 16, the projections 34 and 35 of the apartment walls being displayed on the cells 2 and 3. Several stage planes are thus produced: a view of the apartment in the foreground, a view of the city streets in the background, and scenery accessories 41 through 45 disposed in front on the foreground. As the scenario is unfolding, the actor 46 is really in any of these grounds, i.e. in the space required by the scenario: in the street, apartment, on the square, etc.

A TV-set on the screen of which the spacecraft flight is watched is in the apartment. Moreover, the image 21 of the spacecraft flying above the city is displayed on the cell 5.

FIG. 6 completes the scenario of the spacecraft launching. The audience can see at one and the same time and at different scenery grounds the real image of different three-dimensional scenes changing in time and space: the preparation of the search group with the image of the helicopter 37 on the cell 14 providing the foreground, the spacecraft landing shown on the cell 15 providing the background, the Earth surface area where the spacecraft landing module will land shown on the cell 16 (the foreground).

Such scenario unfolding in space and time ensures a strong psychological and emotional impact upon the audience since it enhances the illusion of its direct participation in the events.

The video system according to the invention offers the functions of an independent space infinitely changing in space and time, i.e. capable of being doubled, trebled, quadrupled so as to form a cyclic closed space.

As a result, a theatrical show is produced which is transformable in space and time, capable of producing, together with the cast performance, the maximum effect of the audience's presence and participation in a given theatrical show and carrying it to any place which is in the scenario and which the up-to-date television and cinematography is capable of showing.

Thus, the provision of television with monitors capable of directly picking out any events from real life as well as real people and actors and immediately carry them from the stage to the screen plane provides the video system with unlimited maneuverability and multiple-aspect character of situations produced on the screen and makes it possible to program by means of electronic tricks, i.e. to prepare in advance information objectives and objectives as formulated by the producer by modulating them and providing computer programs of future scenes, events and extreme life situations.

The use of the video system according to the invention also makes it possible to view background pictures accompanying the main performance and the events of the scenes which are hidden from the audience and take place in other planes.

Moreover, in the production of all abovementioned effects of the video information system according to the invention, the information is actually presented within full angle of vision of the eye (somewhat less than 180°) whereas all known visual systems provide the maximum angle of vision of 90° which also speaks in favour of this video system.

The examples of application of the video system according to the invention for providing a theatrical show have been herein illustrated. It is quite similarly used in an exhibition complex for producing three-dimensional information which changes in time and will permit a more interesting and colourful representation of the desired exhibition information. Moreover, the video system may be used as a trainer for training and sepcialists in various branches of science and technology with mass involvement of trainees and provision of conditions and situations approximatley the real ones and also for taking decisions in time shortage conditions, the training information changing in time and space.

This invention can be used most effectively for theatrical performances, cinema and television programs, exhibitions, advertizing, and in various training devices to simulate various realistic situations.

I claim:

1. A video information system comprising a multisectional screen (1) having three cells (2, 3, 4) for receiving and displaying dedicated information sent by at least one projector (69) to a selected combination of the cells, wherein at least two cells (2-4) of said multisectional screen (1) are movable in space in at least one direction and form at least one three-dimensional multi-plane screen system capable of varying in space, a first cell being a transverse cell (4) located at the top of and across said multisectional screen (1) and being rotatable about an axis (8) arranged parallel to an upper edge of the multisectional screen (1), the other two cells being longitudinal cells (2, 3).

2. A video information system as claimed in claim 1, wherein said first transverse cell (4) of the multisectional screen (1) is movable up and/or down with respect to the longitudinal cells (2, 3).

3. A video information system as claimed in claim 1 or 3, wherein each longitudinal cell (2, 3) of the multisectional screen (1) is rotatable about an axis (6, 7) arranged along a respective lateral edge of the multisectional screen (1).

4. A video information system as claimed in claim 3, wheein each longitudinal cell (2,3) of the multisectional screen (1) is movable along a plane of the multisectional screen (1).

5. A video information system as claimed in claim 3, wherein each cell (2-4) of the multisectional screen (1) is movable in a direction perpendicular to a plane of the multisectional screen (1).

6. A video information system as claimed in claim 1 or 3, wherein each longitudinal cell (2, 3) of the multisectional screen (1) is movable along a plane of the multisectional screen (1).

7. A video information system as claimed in claim 6, wherein each cell (2-4) of the multisectional screen (1) is movable in a direction perpendicular to a plane of the multisectional screen (1).

8. A video information system as claimed in any one of claim 1 or 2, wherein each cell (2-4) of the multisectional screen (1) is movable in a direction perpendicular to a plane of the multisectional screen (1).

9. A video information system comprising a multisectional screen (12) having at least four cells (2-4, 14-16) for receiving and displaying dedicated information sent by at least one projector to a selected combination of the cells, wherein at least two cells (2-4, 14-16) of the multisectional screen (12) are movable in space in at least one direction and form at least one three-dimensional multi-plane screen system capable of varying in space, a first cell being a transverse cell (4) located at the top of and across the entire multisectional screen (12) and being rotatable about an axis (8) arranged along an upper edge of the multisectional screen (12), other cells (2-3, 14-16) being longitudinal cells.

10. A video information system as claimed in claim 9, wherein at least one longitudinal cell (2, 3, 14-16) of the multisectional screen (12) is movable along a plane of the multisectional screen (12).

11. A video information system as claimed in claim 9, wherein at least one cell (2-4, 14-16) of the multisectional screen (12) is movable in a direction perpendicular to a plane of said multisectional screen (12).

12. A video information system as claimed in claim 11, wherein at least one cell (2-4, 14-16) of the multisectional screen (12) is movable up and/or down.

13. A video information system as claimed in claim 11, wherein each longitudinal cell (2, 3 14-16) of the multisectional screen (12) is rotatable about a respective axis (6, 7) arranged parallel to a lateral edge of said multisectional screen (12).

14. A video information system as claimed in claim 9, wherein at least one cell (2-4, 14-16) of the multisectional screen (12) is movable up and/or down.

15. A video information system as claimed in claim 14, wherein each longitudinal cell (2, 3, 14-16) of the multisectional scrren (12) is rotatable about a respective axis (6, 7) arranged parallel to a lateral edge of said multisectional screen (12).

16. A video information system as claimed in claim 9, wherein each longitudinal cell (2, 3, 14-16) of the multisectional screen (12) is rotatable about a respective axis (6, 7) arranged parallel to a lateral edge of said multisectional screen (12).

17. A video information system comprising a multisectional screen having at least two cells for receiving and displaying dedicated information sent by at least one projector to a selected combination of the cells, wherein at least two cells of the multisectional screen are movable in space in at least one direction and form at least two three-dimensional multi-plane screen systems arranged parallel to one another, one after another, and capable of varying in space.

18. A video information system according to claim 17, wherein first and second systems of said at least two three-dimensional multi-plane screen systems are respectively arranged along at least parts of the perimeters of first and second curvilinear surfaces, wherein the radius of curvature of the second curvilinear surface is larger than the radius of curvature of the first curvilinear surface.

* * * * *